United States Patent Office 3,082,053
Patented Mar. 19, 1963

3,082,053
TREATMENT OF POLYESTERS WITH COVALENT COMPOUNDS TO IMPROVE DYEABILITY
Eric Paul Goodings, George Wright Taylor, and William Alexander O'Neill, all of Harrogate, England, assignors to Imperial Chemical Industries Limited, London, England, a corporation of Great Britain
No Drawing. Filed Jan. 20, 1960, Ser. No. 3,475
Claims priority, application Great Britain Jan. 21, 1959
22 Claims. (Cl. 8—100)

This invention relates to shaped oriented articles made from hydrophobic fibre-forming synthetic polyesters, more particularly its relates to such articles having an improved receptivity for dyestuffs.

Hydrophobic fibre forming synthetic polyesters, more particularly those containing a terephthaloyl group in the repeat unit of their molecules and exemplified by polyethylene terephthalate, are either sparingly dyeable or not dyeable at all with disperse dyes or acid dyes, under the usual dyeing conditions. Various proposals have been made to make the polyesters more readily dyeable, such as by incorporating readily dyeable substances into the polyester during or before the polycondensation of the polyester. However, the incorporation of the other substance to form e.g. copolyesters, has been accompanied with a deterioration of some of the desirable original properties of the unmodified polyester. Various dyeing techniques, using e.g. super-atmospheric temperatures and pressures are in use, but they require special equipment in the dyehouse. The introduction of so called "carriers" into the dyebath improves the dye uptake but some carriers are toxic and they can give rise to difficulties in the dyeing process.

It is well known that the difficulties in dyeing polyesters are increased when the latter are in a highly oriented state i.e. in their usual form of drawn filaments, fibres or films. The present invention is particularly directed to the overcoming of the difficulties associated with the dyeing of the polyesters in their highly oriented forms i.e. as drawn filaments, fibres and films.

We have made the observation that certain covalent compounds, which will be defined hereafter, can penetrate hydrophobic fibre forming synthetic polyesters even when these are in their shaped and highly oriented form.

The covalent compounds which are capable of penetrating and improving certain properties of the polyesters are of a type which is assimilable by the shaped oriented polyesters and furthermore they are capable of reacting with water or another hydroxylating agent, even after penetration into the polyester. This reaction changes the covalent compounds to an ionic species i.e. to an acid or a base. The changed covalent compound remains trapped within the polyester where the acidic or basic groups become available as receptive centres for further agents, particularly dyestuffs. Unexpectedly these covalent compounds when they have been changed to an acid or a base by a hydroxylating agent after penetration into the polyester, i.e. in situ, are not subsequently removed completely by a treatment in aqueous media such as are used in dyeing, finishing or washing. Some covalent compounds are found to improve the polyesters, e.g. by increasing the dye receptivity, considerably while other covalent compounds, having large molecules, are relatively ineffective. Thus organic acid halides such as methionic acid dichloride is very effective, whereas the larger molecule of benzene-p-disulphonyl chloride remains relatively ineffective, because it does not penetrate.

According to our invention therefore, we provide improved shaped fibre forming synthetic polyesters, particularly polyethylene terephthalate, which contain sites for treating agents, particularly dyestuffs provided by a covalent compound as herein defined, which is dispersed throughout the polyester and which can be converted in situ to an ionic species, particularly to an acid or basic species.

The improved shaped oriented articles may be obtained by treating the fibre forming polyesters, such as polyethylene terephthalate, with a covalent compound which has the property of being able to penetrate even the shaped and oriented polyester, for example in the form of a filament, fibre or film and furthermore which can be changed in situ into an ionic species, particularly an acid or a base by subsequent application of a hydroxylating agent.

The treatment of the fibre forming polyester with the covalent compound is carried out essentially in the absence of any hydroxylating agents, until a sufficient quantity has been assimilated by the polyester. Amounts of between 1 and 5% by weight can thus be incorporated into the polyester, in most cases without the help of any other agents and even without raising the temperature, unless a particularly speedy penetration is required.

As already mentioned the covalent compound should be capable of reacting with a hydroxylating agent. Covalent compounds which are rapidly hydrolized or which are unstable under normal conditions may be used for our treatment, and we have found that those covalent compounds which react with water within not more than five minutes at room temperature suitable.

The covalent compound may be used as such or in combination with another suitable covalent compound or compounds or as a molecular complex with e.g. dioxane, trimethylamine or pyridine, and it may be used in its liquid or vapour phase. If desired the covalent compound may be diluted with a suitable diluent. The compounds may be used in solutions in one or more inert solvents, such as petroleum ether. Suitable concentrations of the compounds in the inert solvent are from 5 to 10% by weight but may be any value up to 100% depending on the time and temperature of the treatment desired.

Temperatures at which the compounds may be used are not critical, but it will be appreciated that temperatures below the decomposition temperature of the articles should be used. Even room temperatures are suitable for certain compounds which act sufficiently rapidly to make heating to elevated temperatures unnecessary for commercially acceptable durations of treatment.

From the covalent compounds which are changed into an ionic species and which is an acid, a number of phosphorus containing compounds are suitable, which may be defined by

or

where
X=Cl, NCO, NCS, alkoxy or aryloxy
Y=Cl, NCO, NCS, alkoxy or aryloxy
Z=Cl, NCO, or NCS Such phosphorus compounds comprise chlorides of phosphorus oxy-acids, such as phosphorus oxychloride, and alkane phosphoryl chloride, alkyl and aryl phosphorochloridates and phosphorodichloridates, and also phosphorus isocyanates, such as phosphorus triisocyanate and phosphorus oxyisocyanate.

Other typical covalent compounds which are changed into an acid include methionic acid dichloride, alkane sulphonyl chloride or alkane sulphonic anhydrides or polysulphonyl chloride and silicon tetrachloride.

Covalent compounds which are changed into a base which is an ionic species, are of interest as they confer sensitivity to acid dyes to the shaped polyester.

The treated shaped polyesters are preferably washed with water prior to dyeing and they may be exposed to ammonia or an organic amine before, during or after the treatment. Suitable amines comprise mono-, di-, and tri-substituted amines e.g. pyridine, dimethylamine and ethylene diamine. The amines may be applied in the liquid or vapour phase, by themselves or with a diluent, which may be a non-hydroxylic or hydroxylic liquid solvent for the amine. They may be applied at room temperature or at lower temperatures, or if necessary at a raised temperature.

The dye receptivity i.e. the rate at which dyes diffuse e.g. into the fibre, and the maximum concentration of the dye in the fibre which is obtained during a commercially acceptable time of dyeing, are considerably increased, particularly when using a dyeing technique with disperse dyes. Thus for the treatment to be acceptable we consider that the dye receptivity must be increased at least two fold, but in some cases more than a ten fold increase can be obtained even after a short treatment lasting only for a few minutes.

Subsequent to the treatment with the covalent compound is the treatment with a hydroxylating agent which may be carried out continuously and immediately after completion of the treatment with the covalent compound, or at a later stage and as a separate operation, if desired.

The treatment with the covalent compound is surprisingly effective when carried out even on highly oriented and crystalline shaped polyesters such as drawn fibres, yarns and films, but it can also be carried out on the undrawn shaped structures.

The treatment may advantageously be carried out by the fibre manufacturers, so that the user dyer or finisher receive the shaped polyester having a controlled improved dye receptivity and other improved properties, such as improved bonding properties, e.g. improved adhesion to rubber.

The treatment with the covalent compound may be carried out continuously by feeding the shaped polyesters in the form of filamentary tows or films through a contacting zone in which the compound, if desired in solution in a suitable solvent, is maintained at the boil or at a suitable temperature which is appropriate for a particular contacting zone and time of treatment required.

Therefore, according to another aspect of our invention we provide a continuous process for treating shaped oriented articles such as films, yarns or tows of synthetic linear polyesters with a covalent compound, particularly phosphorus halide or oxyhalide, comprising the steps of continuously feeding the oriented shaped articles through a contacting zone maintained at or near the boiling point of said compound, stripping excess liquid picked up in the contacting zone, preferably by a current of hot air, washing the oriented articles with water and drying the articles, if desired assisted by a low boiling solvent such as acetone, and a current of hot air prior to winding onto suitable packages.

The contacting of the shaped articles may be carried out by their passage through the vapours of the compound. Conveniently this is done by maintaining the compound at the boil in a suitable vessel under reflux conditions and by guiding the shaped articles through the vessel without dipping them below the level of the boiling compound.

The following examples in which all parts and percentages are by weight, illustrate but do not limit our invention.

*Example 1*

One part by weight of a knitted fabric made from drawn polyethylene terephthalate filament yarn having an intrinsic viscosity of 0.595, is refluxed for 20 mins. with 100 parts of a mixture containing 10 parts of phosphorus oxychloride and one part by volume, of pyridine.

The fabric is removed from the phosphorus oxychloride mixture and washed for 10 mins. in cold running water, followed by soaking in 10% aqueous ammonia for 10 mins., and a further washing in cold running water for 10 mins. The treated polyethylene terephthalate (intrinsic viscosity 0.53) is then dyed for 1 hour at the boil in a dye-bath containing 0.05% "Dispersol" Fast Scarlet B. 150 (registered trademark) and 0.05% "Lissopol" C (registered trademark) at a liquor-to-goods ratio of about 400 to 1. The dyed fabric is washed, reduction cleared with a solution containing 1 part of ammonia, 2 parts of sodium dithionite and 2 parts of "Lissolamine" A (registered trademark) paste, in 1000 parts of water, rinsed in a solution of 1 part "Lissapol" C in 1000 parts of water, and finally washed with running water and dried. The treated and dyed fabric sample is dyed to a heavy plum colour shade.

A similarly dyed but untreated fabric sample is dyed to a light pink shade. The treated and dyed fabric sample and a similarly dyed but untreated fabric sample are stripped of dye with boiling chlorobenzene, and the dye extracts compared spectrophotometrically to determine the amount of dye taken up by each sample. The treated sample takes up about 13 times as much dye as the untreated fabric.

*Example 2*

A drawn non-heat set 4000 denier tow of polyethylene terephthalate is fed continuously through a contacting unit containing phosphorus oxychloride maintained at the boil at atmospheric pressure so that the contact time is 2.5 mins. On leaving the contacting unit excess liquid is stripped by a counter current flow of hot air at about 90° C. and then through a washer with hot running water where all phosphorus oxychloride remaining freely on the surface of the treated tow is removed. The washed tow is dried by continuous passage through an acetone bath in the form of a U-shaped glass tube and dried by a current of warm air on leaving the acetone bath and before being wound up on large bobbins.

The dye-uptake of the treated tow improved by about 4 fold and there is negligible deterioration in the fibre during dyeing; the tenacity of the treated tow is reduced by 15% compared with an untreated tow.

The contacting unit consists of a long vertical lagged glass tube fitted with a boiler unit at the bottom, a condenser coil near the constricted open top and a polytetrafluoroethylene (PTFE) guide near the bottom but above the level of the liquid boiling in the boiler unit. The tow is guided through the open top, down the tube over the PTFE guide above the boiling liquid level, up and out again through the top, without touching the incoming tow, the walls of the tube or the condenser.

*Example 3*

A knitted fabric made from drawn polyethylene terephthalate filament yarn having an intrinsic viscosity of 0.595, is immersed in diphenylphosphorochloridate and heated at 100° C. for one hour. The fabric is then removed from the diphenylphosphorochloridate and boiled with water for five minutes. The fabric is then rinsed with ethyl alcohol, and finally washed in running water at 40° C. for 15 minutes. The fabric, which suffers no appreciable deterioration in mechanical properties, is then dyed for one hour at the boil in a dye-bath containing 0.5 g. per litre of a red dispersed dye "Dispersol" Fast Scarlet B.150 (registered trademark) and 1 g. per litre of a dispersing agent "Lissapol" C (registered trademark) at a liquor-to-goods ratio of about 400 to 1. The dyed fabric is washed, and soaped with a solution containing 2 g. per litre of "Lissapol" C at 65° C. for 10 minutes followed by rinsing in running water at 40° C.

The treated fabric is dyed to about four times the depth of shade compared with an untreated control sample of the same fabric.

*Example 4*

A sample of the knitted fabric used in Example 3 is immersed in diethylphosphorochloridate, and heated at 100° C. for one hour. The treated fabric is then washed in running water at 40° C. for 30 minutes. It suffers no appreciable deterioration in mechanical properties.

When dyed as in Example 3, the treated fabric takes up about four times the amount of dye compared with an untreated control sample of the same fabric.

*Example 5*

A sample of knitted fabric used in Example 3 is immersed in phenylphosphorodichloridate, and heated at 100° C. for one hour. The treated fabric is then rinsed in methyl alcohol, and washed in running water at 65° C. for 30 mins. It suffers no appreciable deterioration in mechanical properties.

When dyed as in Example 3, the treated fabric takes up about six times the amount of dye as an untreated control sample.

*Example 6*

A knitted fabric made from drawn polyethylene terephthalate filament yarn having an intrinsic viscosity of 0.595, is coated with phosphorus tri-isocyanate over a desired area to form a pattern. The fabric is then enclosed in a glass vessel and heated at 150° C. for 10 minutes. The fabric is then removed from the glass vessel and washed in cold running water for 10 minutes. The fabric, the treated area of which suffers no appreciable deterioration in mechanical properties, is then dyed for one hour at the boil in a dye-bath containing 0.5 g. per litre of "Dispersol" Fast Scarlet B.150 (registered trademark) and 1 g. per litre of "Lissapol" C (registered trademark) at a liquor-to-goods ratio of about 400 to 1. The dyed fabric is washed, and soaped with a solution containing 2 g. per litre of "Lissapol" C at 65° C. for 10 minutes, followed by rinsing in running water at 40° C. The phosphorus isocyanate-treated pattern is dyed to a heavy plum colour shade leaving the untreated area only lightly dyed.

*Example 7*

A fabric of continuous filament polyethylene terephthalate is dyed with "Dispersol" Fast Scarlet A at 100° C. for 30 minutes.

A sample of the same fabric is treated with a 1% solution of methionic acid dichloride in chloroform for 30 seconds and is then dyed under the same conditions. The uptake of dye is increased 8.3 times.

*Example 8*

A fabric as in Example 7 is run under an embossed roller impregnated with methionic acid dichloride and then immediately into a cold water bath. The time of contact on the roller is 0.5 second. The treated material is then run through a dye-bath of methylene blue 2BNS. Time of dyeing is for 1 minute at 100° C. The fabric is then scoured and appeared as having a deep blue pattern on a pale blue ground.

*Example 9*

A fabric as in Example 7 is treated for 30 seconds with chloracetyl chloride at room temperature and is then treated with ammonia and dyed at 100° C. with naphthalene green G.S. Dye uptake is increased perceptibly over a control untreated fabric.

*Example 10*

A sample of polyethylene terephthalate fabric is printed with a silicone wax and then treated with methylsulphonyl chloride at room temperature and immediately washed in water and chloroform and dyed with methylene blue for one minute. The pattern appears as a pale blue on a deep blue ground.

*Example 11*

Chlorine, sulphur dioxide and propane gas were passed into carbon tetrachloride at the boil under U.V. irradiations. Polyethylene terephthalate fibre immersed in the reaction product and dyed subsequently with "Duranol" Blue, a disperse dye, gave a dye uptake of 11.3 times that of an untreated fabric sample. In the absence of propane no improvement in dye uptake occurred. The reaction product in the presence of propane was a mixture of propyl sulphonyl chloride and propane disulphonyl chloride.

*Example 12*

A continuous filament of polyethylene terephthalate is drawn through a bath of methionic acid dichloride in chloroform solution and immediately through a water bath, the product readily dyes with magenta dye a deep violet shade.

A control fibre remains almost colourless.

*Example 13*

A sample of polyethylene terephthalate fabric is treated with methylphosphoric acid dichloride in chloroform solution at 70° C.

Dye uptake to basic and disperse dyes is increased compared with a control untreated sample of the fabric.

*Example 14*

A tow of "Terylene" fibre is immersed in phosphorus oxychloride vapour at 100° C. with a contact time of five minutes and is subsequently exposed to the vapours of ammonia at 100° C. for five minutes. The resulting fibres dye readily with acid dyes to deep shades.

*Example 15*

A tow of "Terylene" fibre is treated with a 10% solution of sulphonyl chloride in ethylene dichloride at 80° C. for three minutes, and after rinsing in ethylene dichloride is treated with a 10% solution of ethylene diamine in ethylene dichloride at 60° C. for one minute. The treated tow dyes readily with acid dyes.

It will be appreciated that various dyeing effects, such as cross dyeing effects may be obtained by combining our treated filaments or fibres with untreated polyesters or other filaments or fibres in the form of yarns and/or fabrics which are then submitted to a yarn or fabric dyeing process.

"Terylene" is a registered trademark for the polyethylene terephthalate fibre made by I.C.I. Ltd.

What we claim is:

1. A process for improving susceptibility to treating agents such as dyestuffs of shaped polyalkylene terephthalates comprising dispersing under anhydrous conditions and in the absence of hydroxylating agents throughout said polyester a covalent compound which is subsequently capable of being converted in situ to an ionic species by a hydroxylating agent, said hydroxylating agent being selected from the group consisting of water, ammonia and amine within not more than three minutes at room temperature, said covalent compound being selected from the group consisting of methionic acid dichloride, alkane sulphonyl chloride, alkane sulphonic anhydrides, polysulphonyl chloride, silicon tetrachloride, ferric trichloride, aluminum trichloride, zinc dichloride and phosphorus containing compounds having one of the formulae

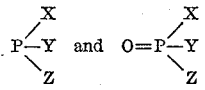

wherein X is a member of the group consisting of —Cl, —NCO, —NCS, alkoxy and aryloxy, Y is a member of the group consisting of —Cl, —NCO, —NCS, alkoxy and aryloxy and Z is a member of the group consisting of —Cl, —NCO, and —NCS, said covalent compound penetrating said fiber and being capable of conversion at the point of penetration to an ionic species which increases dye receptivity, and thereafter reacting said covalent compound with said hydroxylating agent, whereby said conversion and increase in dye receptivity is effected.

2. A process according to claim 1 in which the treatment with the covalent compound is carried out until 1–5% by weight of the compound is incorporated into the polyester.

3. A process according to claim 1 wherein the selected covalent compound is capable of reacting with water within not more than five minutes at room temperature.

4. A process according to claim 1 in which the covalent compound is used in its liquid phase.

5. A process according to claim 1 in which the covalent compound is used in its vapour phase.

6. A process according to claim 1 in which the covalent compound is diluted with a diluent.

7. A process according to claim 1 in which the treatment with the covalent compound is carried out at a temperature between the decomposition temperature of the shaped polyesters, and room temperature.

8. A process according to claim 1 wherein the treated polyesters are washed with water prior to dyeing.

9. A process according to claim 1 wherein the treated polyesters are exposed to ammonia.

10. A process according to claim 1 wherein the treated polyesters are exposed to an organic amine.

11. A process according to claim 10 wherein the said amine is pyridine.

12. A process according to claim 10 wherein the amines are applied in the liquid phase.

13. A process according to claim 10 wherein the amines are applied in the vapor phase.

14. A process according to claim 10 wherein the amines are applied with a diluent.

15. A process according to claim 10 wherein the amine is a member of the group consisting of mono, di- and trisubstituted amines.

16. A process according to claim 15 wherein said amine is ethylene diamine.

17. A process according to claim 1 wherein the covalent compound is used as a molecular complex.

18. A process as set forth in claim 17 wherein the covalent compound is used as a molecular complex of a member of the group consisting of dioxane, trimethyl amine and pyridine.

19. A process as set forth in claim 1 in which the polyethylene terephthalate is in the form of a shaped oriented article and is treated by continuously feeding it through a contacting zone containing said covalent compound, maintaining the covalent compound at a temperature not substantially below the boiling point thereof, withdrawing said shaped oriented article from said zone, stripping excess liquid from said article, washing the oriented article with water and drying said article.

20. A process as set forth in claim 19 in which the shaped articles are contacted with said covalent compound by passage through its vapors above a body of liquid covalent compound which is maintained not substantially below the boiling point, under reflux conditions, and without dipping the article below the surface of the boiling compound.

21. A shaped fiber of polyethylene terephthalate treated according to the process of claim 1.

22. The process according to claim 1, wherein said fibers so treated are thereafter dyed.

References Cited in the file of this patent

UNITED STATES PATENTS

| 2,025,072 | Osborne | Dec. 24, 1935 |
| 2,167,234 | Dreyfus | July 25, 1939 |
| 2,465,319 | Whinfield et al. | Mar. 22, 1949 |
| 2,945,010 | Caldwell et al. | July 12, 1960 |

FOREIGN PATENTS

| 697,983 | Great Britain | Oct. 7, 1953 |
| 822,483 | Great Britain | Oct. 28, 1959 |

OTHER REFERENCES

J.S.D.C., October 1949, p. 469–478.